March 29, 1927.
L. LAXTON ET AL
1,622,454
STEERING WHEEL LOCK
Filed May 29, 1926    2 Sheets-Sheet 1
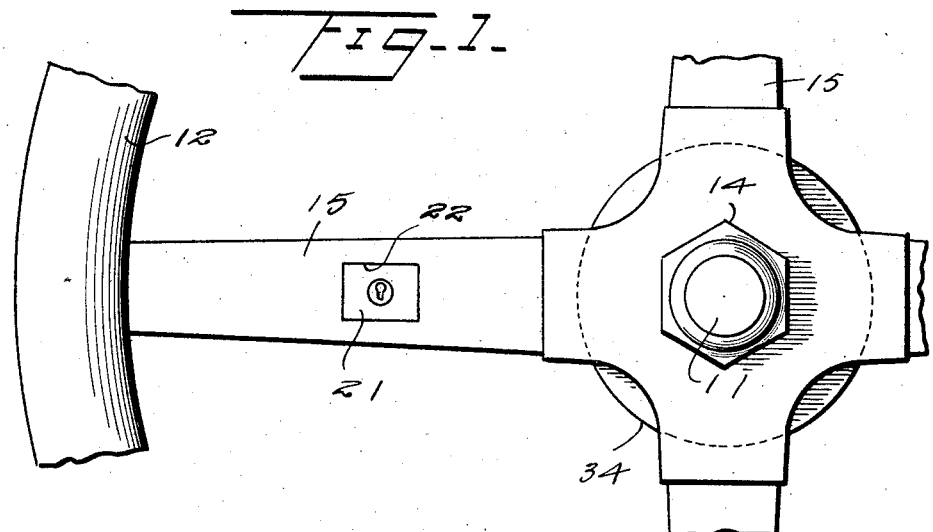
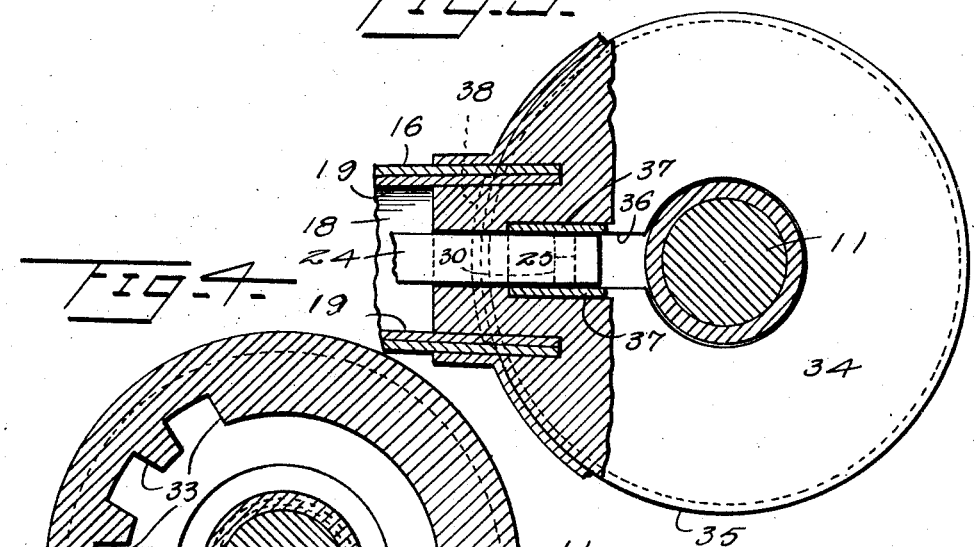
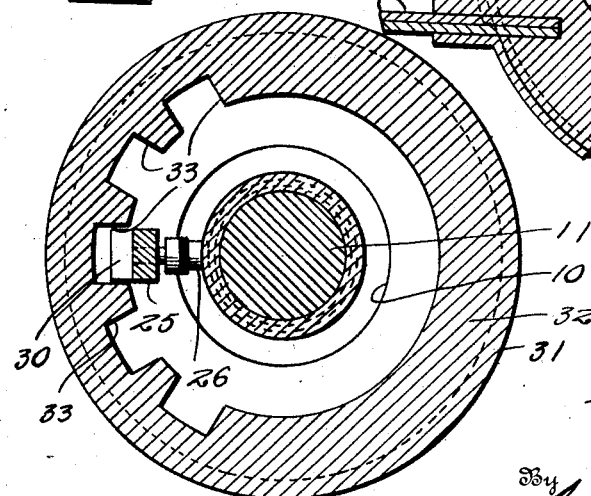
Inventors
Lacey Laxton,
O. L. Trosper,
By Watson E. Coleman
Attorney

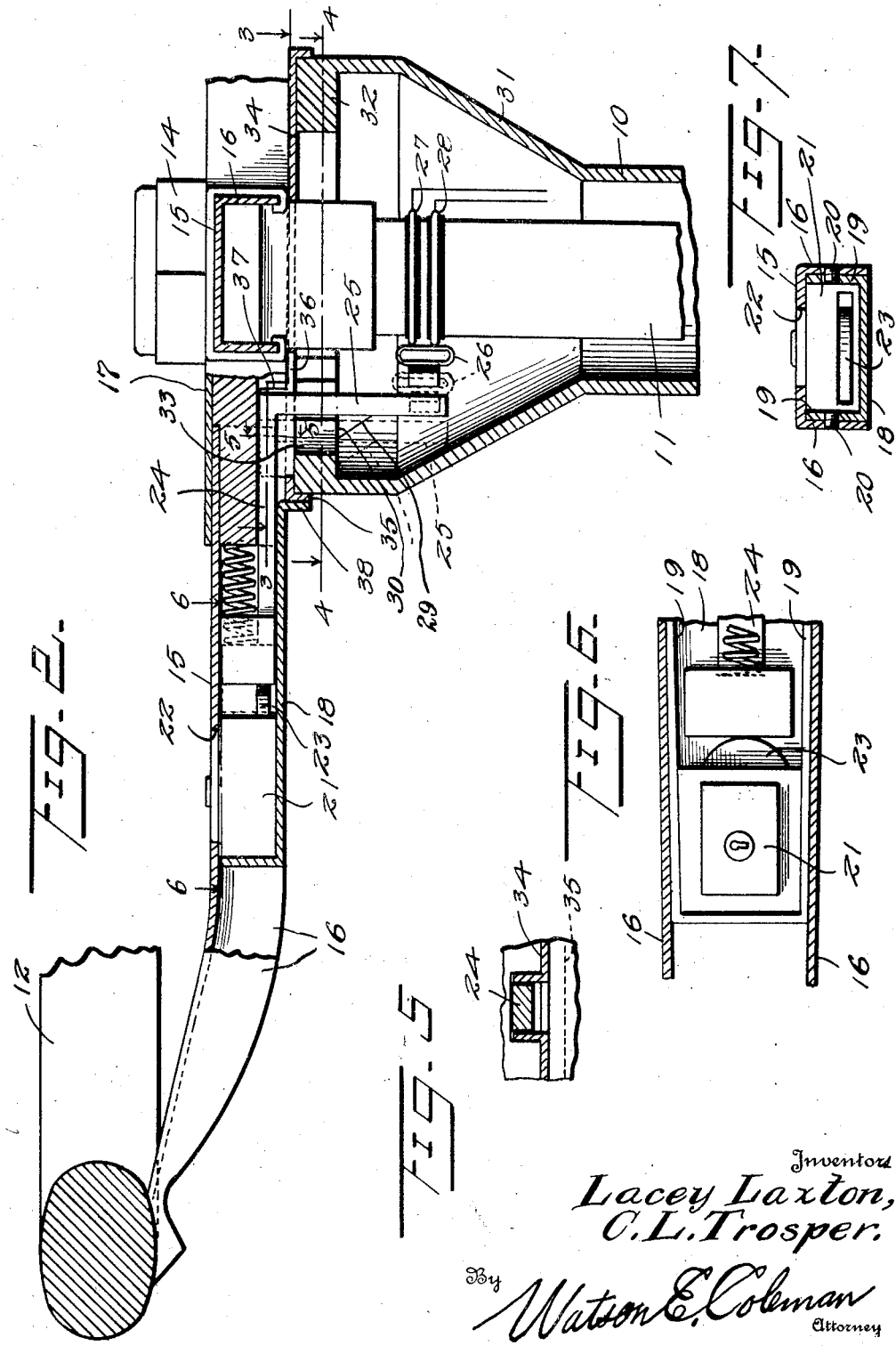

Patented Mar. 29, 1927.

1,622,454

UNITED STATES PATENT OFFICE.

LACEY LAXTON AND CHARLES L. TROSPER, OF BLACK JOE, KENTUCKY.

STEERING-WHEEL LOCK.

Application filed May 29, 1926. Serial No. 112,639.

This invention relates to improvements in steering wheel locks and more particularly to an improvement of the steering wheel lock shown in our prior application, Serial No. 91,230, filed February 27, 1926, for steering wheel locks, of which this application is a continuation in part.

An important object of the present invention is to improve the structure of the lock so that a standard locking device may be employed.

A further object of the invention is to provide a device of this character wherein the locking part, in addition to locking the steering wheel against rotation with relation to the steering post housing, also serves to break the ignition circuit of the vehicle.

A still further object of the invention is to provide a device of this character in which the locking part additionally serves to secure the steering wheel against removal from the steering wheel post.

A still further object of the invention is to provide a device of this character which may be very readily attached to the steering wheel and which may be readily and cheaply produced.

These and other objects we attain by the construction shown in the accompanying drawings, wherein for the purpose of illustration is shown a preferred embodiment of our invention and wherein:—

Figure 1 is a plan view of a fragment of a steering wheel having a lock constructed in accordance with our invention;

Figure 2 is a transverse sectional view through the lock and steering post housing;

Figure 3 is a section on the line 3—3 of Figure 2;

Figure 4 is a section on the line 4—4 of Figure 2;

Figure 5 is an enlarged vertical sectional view taken through the cap on the line 5—5 of Figure 2;

Figure 6 is a section on the line 6—6 of Figure 2;

Figure 7 is a sectional view showing the manner of mounting the mechanism in the spoke of the steering wheel.

Referring now more particularly to the drawings, the numeral 10 generally designates a steering post housing, 11 a steering shaft and 12 a steering wheel rigidly secured to the upper end of the steering shaft by a nut 14. The spokes of the wheel are at present illustrated in the form of a channel having the bight 15 thereof horizontally arranged and the arms 16 thereof downwardly directed. The inner ends of each of the spokes are rigidly secured to a hub portion 17 which is, in turn, secured to the shaft 10 by the nut 14.

Where the steering wheel spoke is of this type, we employ a lock housing including a bottom plate 18 adapted to bridge the distance between the lower ends of the arms and having at its sides upstanding flanges 19 abutting the inner faces of these arms and secured thereto by blind screws 20 or the like. At its outer end, the plate 18 has an upstanding flange closing the end of the housing thus produced with the spoke. Within this housing a lock 21 is disposed with its upper end projecting through an opening 22 formed in the bight of the spoke channel. The lock 21 may be of any standard construction and is at present illustrated as including a key rotated eccentric or cam 23 with which is engaged one end of a locking part 24 which slides upon the bottom plate 18. The inner end of this locking part extends adjacent to the steering shaft 11 and is provided with a downturned end 25 paralleling the shaft. At one side face, this downturned end portion is provided with a spring brush 26 insulated from the locking part and adapted to simultaneously engage with conductor rings 27 and 28 connected at opposite sides of a gap in the ignition circuit of the motor of the vehicle (not herein disclosed). At its opposite side, the extension 25 is provided with a lug 29 having a flat upwardly facing shoulder 30, the purpose of which will presently appear.

The upper end of the steering post housing 10 is formed with a bell 31, the upper edge of which is provided with an inwardly directed flange 32 notched at circumferentially spaced points to form lugs 33 for a portion of its width. Between the hub 17 and the mouth of the bell a cap 34 is disposed, this cap having a downturned flange 35 fitting about the upper end of the bell to prevent the insertion of thin blades for engagement with the downturned extension 25 of the locking part, the hub serving to prevent vertical movement of the cap. This cap is provided with a slot 36 in which the locking part, or extension 25 thereof, operates and a portion of the metal removed in the formation of this slot is upbent at the edges of the slot to provide flanges 37, preventing access to the locking part by a tool inserted at right angles to the locking part and between the cap and hub. The inner end of the bottom plate 18 of the casing is formed with a downturned flange 38 abutting the outer face of the flange 35 of the cap 34, so that a tool cannot be inserted longitudinally of the locking part for engagement with the angular extension 25.

In the operation of the lock, when the locking part is shifted outwardly by the cam 23, the downturned extension 25 enters between the lugs 33, preventing relative rotation of the steering post housing 10 and steering wheel. At the same time, the ignition circuit is broken by the separation of the brush 26 from the contacts 27 and 28 and the lug 29 has its shoulder 30 arranged beneath the flange, so that the steering wheel may not be vertically shifted, even though the nut 14 be removed. This latter feature is effective in preventing theft of the vehicle by bodily removal of the lock wheel and the substitution therefor of a wheel of ordinary make.

Since the construction hereinbefore set forth is obviously capable of a certain range of change and modification without materially departing from the spirit of our invention, we do not limit ourselves to such specific structure except as hereinafter claimed.

We claim:—

1. In a steering wheel lock, a steering post, a housing therefor having an inwardly directed flange provided at its inner face with lugs, a steering wheel mounted upon the post, a lock upon the steering wheel including a locking part which, in its locking position, has a portion extending between adjacent lugs of the flange and another portion extending beneath said flange to prevent vertical displacement of the steering wheel.

2. In a steering wheel lock, a steering post, a housing therefor having an inwardly directed flange provided at its inner face with lugs, the post within the housing having mounted thereon spaced circumferentially extending contacts, a steering wheel mounted upon the upper end of the post, a lock upon the steering wheel including a locking part which, in one position thereof, has a portion extending between adjacent lugs of the flange and a brush carried by the locking part and in the second position thereof engaging said contacts to connect the same.

3. In a steering wheel lock, a steering post, a housing therefor having an inwardly directed flange provided at its inner face with lugs, the post within the housing having mounted thereon spaced circumferentially extending contacts, a steering wheel mounted upon the upper end of the post, a lock upon the steering wheel including a locking part which, in one position thereof, has a portion extending between adjacent lugs of the flange and a brush carried by the locking part and in the second position thereof engaging said contacts to connect the same, said locking part including a second portion which, in the first named position of the locking part, engages beneath the flange to prevent vertical displacement of the steering wheel.

4. In a steering wheel lock, a steering post, a housing therefor having at its upper end inwardly directed lugs, a steering wheel mounted upon the post, a lock upon the steering wheel including a locking part having a portion engageable between the lugs to prevent relative rotation of the steering wheel and post and a second part to engage beneath said flange to prevent vertical displacement of the steering wheel.

5. In a steering wheel lock, a steering post, a housing therefor having an inwardly directed flange provided at its inner face with lugs, a steering wheel mounted upon the post, a lock upon the steering wheel including a locking part which, in its locking position, has a portion extending between adjacent lugs of the flange and another portion extending beneath said flange to prevent vertical displacement of the steering wheel, said locking part shifting radially of the steering wheel for movement into and out of its locking position, a cap for the steering post housing having a downturned flange fitting about the upper end of the housing and a slot in which the locking part operates, means at the sides of the slot for preventing engagement with the locking part, of a blade inserted between the wheel and cap in a direction transverse to the radius of the steering wheel upon which the locking part operates and a casing for the lock including a part preventing insertion of a blade to the locking part upon said radius.

6. In a steering wheel lock, a steering post, a housing therefor having inwardly directed lugs, a steering wheel mounted upon the post and a lock upon the steering wheel including a locking part which in its locking position has a portion extending between adjacent lugs of the housing.

7. In a steering wheel lock, a steering post, a housing therefor having an inwardly directed flange, a steering wheel mounted upon the post, a lock upon the steering wheel including a locking part which in its locking position prevents relative rotation of the steering wheel with relation to the housing and has a part projecting beneath said flange to prevent vertical displacement of the steering wheel.

In testimony whereof we hereunto affix our signatures.

LACEY LAXTON.
CHARLES L. TROSPER.